July 11, 1939.　　　A. G. RINDFLEISCH　　　2,165,415
SORTER
Filed Aug. 12, 1937　　　8 Sheets-Sheet 4

INVENTOR
ARTHUR G. RINDFLEISCH
BY *W. G. Sparks*
ATTORNEY

July 11, 1939.   A. G. RINDFLEISCH   2,165,415
SORTER
Filed Aug. 12, 1937   8 Sheets-Sheet 5

INVENTOR
ARTHUR G. RINDFLEISCH
BY W. A. Sparks
ATTORNEY

July 11, 1939.   A. G. RINDFLEISCH   2,165,415
SORTER
Filed Aug. 12, 1937   8 Sheets-Sheet 6

INVENTOR
ARTHUR G. RINDFLEISCH
BY W. A. Sparks
ATTORNEY July 11, 1939. A. G. RINDFLEISCH 2,165,415
SORTER
Filed Aug. 12, 1937 8 Sheets-Sheet 7

FIG. 12.

INVENTOR
ARTHUR G. RINDFLEISCH
BY *H. A. Sparks*
ATTORNEY

Patented July 11, 1939

2,165,415

UNITED STATES PATENT OFFICE 2,165,415

SORTER

Arthur G. Rindfleisch, Brooklyn, N. Y., assignor to Remington Rand Inc., Buffalo, N. Y., a corporation of Delaware Application August 12, 1937, Serial No. 158,666

2 Claims. (Cl. 209—110)

This invention relates to sorting machines for statistical cards and the like, and particularly to auxiliary card-sensing mechanism for such machines.

The invention, as herein disclosed, is applied to a Powers type sorter such as is shown in the Patent No. 1,476,161 to W. W. Lasker, dated Dec. 4, 1923. The sorter, in which the present invention is embodied, utilizes a locking device for locking open one or another of the card gates, which device is similar in function to that disclosed in the French Patent No. 679,931 to Accounting and Tabulating Machine Corporation.

Previous to the present invention, cards were sorted into predetermined groups and each group was associated with one sorter pocket. The necessity arose, however, for a machine which would sort the above mentioned predetermined groups into a smaller number of major groups of cards. When a number of minor groups of cards are sorted into a smaller number of major groups, the procedure is known as "group sorting". The present invention accomplishes group sorting by sensing only master cards, one of which is inserted in front of each of the various minor groups of so-called "detail cards" before they are inserted in the machine. A control hole is punched in a predetermined column of each master-card, and, as the cards are run through the sorter, an auxiliary sensing device senses these control holes. When a control hole in a master-card is sensed, the auxiliary sensing device permits the regular pin box to sense the designation punchings in the master-card and send it to a predetermined pocket. At the same time, a locking device locks open the card gate associated with the pocket to which the master-card is being sent. This pocket will remain open until another master-card, having different designation punchings than the preceding master-card, closes this open pocket and locks open another. Since the control holes in the master-cards are always punched in the "XII" position, and since none of the detail-cards are punched here, the auxiliary sensing device will not find a hole in any detail-card and will disable the regular pin box so that a master-card and all the detail cards between it and the next succeeding master-card will be deposited in one sorter pocket.

The above mentioned auxiliary sensing device has only one sensing pin and it is, therefore, evident that data punchings may be made in the same column as that in which the control hole lies, which data punchings will not cause misoperations in sensing, the reason for this being that data punchings always lie in the "0" to "IX" positions of the card, whereas the control punchings always lie in the "XII" position.

One of the objects of the present invention is to sort groups of cards into a smaller number of groups according to a predetermined arrangement.

Another object is to provide mechanism in a sorting machine, which will permit the regular sensing device, thereon, to sense only master-cards.

A third object of this invention is to provide mechanism, in a sorting machine, which will sense special perforations in master-cards and which will not sense data perforations even though the data perforations lie in the same columns of the master-cards as the special perforations.

Another object is to provide, in a sorting machine, an auxiliary sensing device for enabling or disabling the regular sensing device, the auxiliary sensing device being movable to a variety of positions with respect to the regular sensing device.

Other objects and structural details will be apparent from the following description when read in connection with the accompanying drawings, in which.

For the sake of convenience, in the following description, that side of the machine which is at the top in Fig. 12 will be considered the front of the machine. In view of this, the sorter pockets extend from the sensing head toward the left-hand side of the machine and the terms "leftwardly", "rightwardly", etc., will be used accordingly, in connection with all views unless otherwise specified hereinafter.

Card feeding and transporting

In sorting cards sequentially on a standard Powers sorter, a stack of disarranged cards is placed in the magazine 1 (Figs. 1 and 12) and a card-weight 2 is placed on top of the stack. A starter button 3 is then depressed to start the motor (not shown) for the machine. As the motor drive is old and well known, it will not be described in detail herein.

Figure 1:
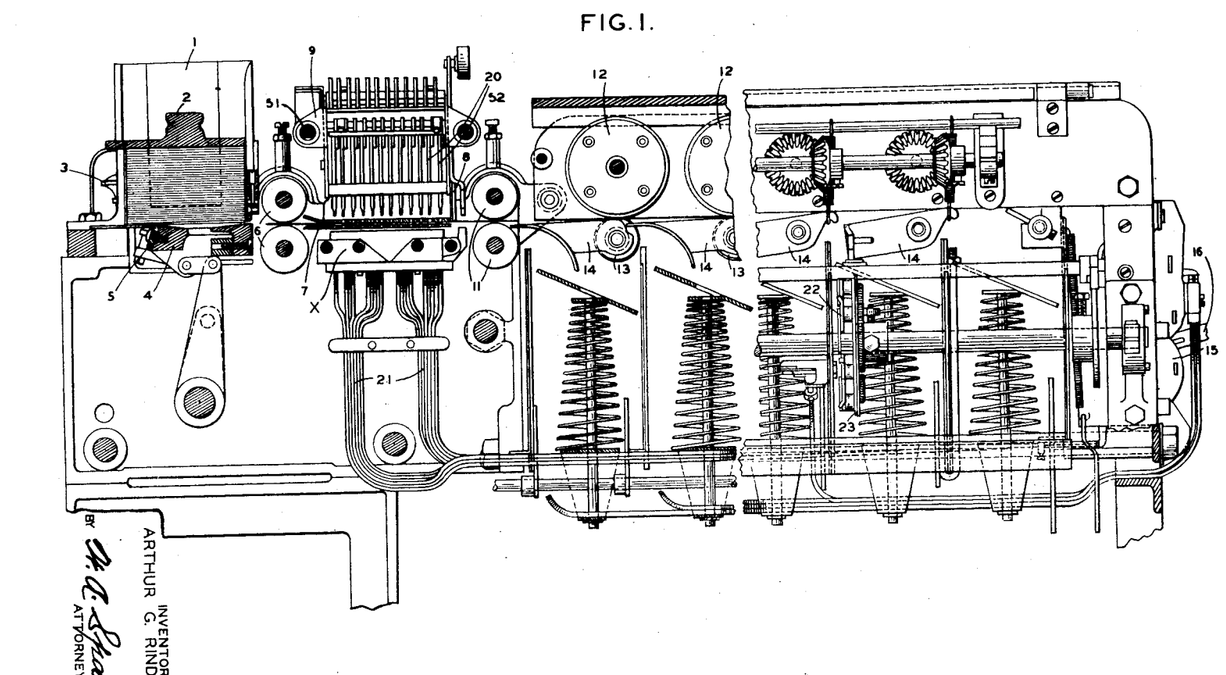
Fig. 1 is a fragmentary rear elevation of a standard Powers sorter.

As is best seen in Fig. 1, a picker block 4, carrying a picker knife 5, picks one card at a time from the bottom of the stack and carries it to a pair of continuously rotating feed rolls 6. The feed rolls 6 carry the cards seriatim into a sensing chamber 7 where a card stop 8 holds each card until it is sensed by a reciprocating pin box which is designated generally by the reference numeral 9. After each card is sensed, the pin box 9 rises and carries with it the card stop 8. This releases the card and allows the usual internal feed rollers (the top ones of which are designated by the reference numeral 10 in Fig. 12) to roll the card into a set of power driven eject rolls 11 while the next succeeding card is being fed into the sensing chamber by the feed rolls 6. The eject rolls 11 feed the cards into the usual power driven conveyor rolls 12 which carry the cards over the idler rollers 13 to their respective pockets. Directly above each card pocket, is a card-gate 14 which lifts, at the proper instant, according to each card sensing, to deflect the cards into their proper pockets.

The machine, shown herein, has the usual interpreter mechanism 15 so that both forty-five-column and ninety-column cards may be sorted with the one machine. This interpreter or combination sensing arrangement is fully shown and described in the Patent No. 2,044,120 to W. W. Lasker, dated June 16, 1936. It is sufficient, here, to say that when a lever 16 is moved to one of its two positions, the machine will sort forty-five-column cards and, when the lever 16 is moved to the other of its positions, the machine will sort ninety-column cards.

Cards and card sensing

Figure 8:
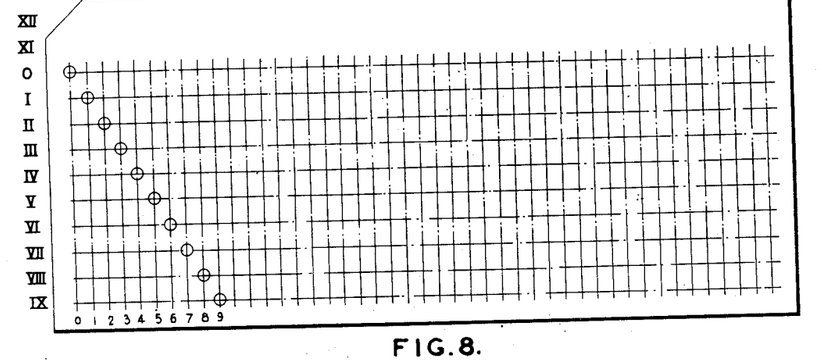
Fig. 8 is a top plan view of a forty-five column card showing the single-hole or forty-five column code and the punching positions I to XII, inclusive.
Figure 9:
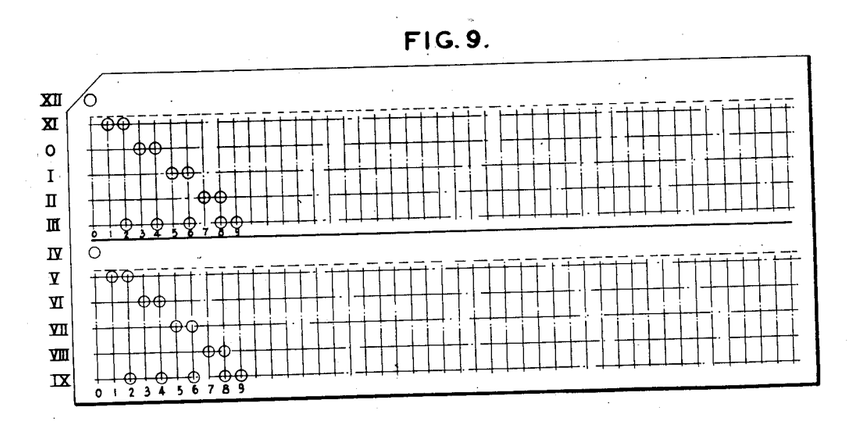
Fig. 9 is a top plan view of a ninety-column card showing the combinational or ninety-column code and the punching positions.

Figs. 8 and 9 show respectively a regular Powers forty-five-column card and a ninety-column card. Each card is divided into twelve row-positions, and each row is divided into forty-five columnar positions, as is old and well known. Fig. 8 shows the single-hole code used with the forty-five-column cards, while Fig. 9 shows the combinational code used with the ninety-column cards. Data is punched on the forty-five-column cards in the ten row-positions 0 to IX, inclusive. In the forty-five-column cards, the XI and XII positions are used as control positions only, and are never used to record data. In the ninety-column cards, the IV and XII positions are used as control positions and the remaining positions are used for data punchings.

Both kinds of cards are sensed by a single set of twelve sensing pins 20, as is best seen in Fig. 1. All twelve pins are used to sense forty-five-column cards but, in sensing ninety-column cards, only six are used. Generally speaking, the card-gates 14 are opened by the sensing pins 20 which, upon finding perforations in the cards, pass through the cards and operate Bowden wires 21 which Bowden wires pass through the interpreting mechanism 15 and, in turn, operate to displace one or another of the six trip-cams 22 pivoted upon each timing disc 23. The displaced trip-cams will at the proper times, open their associated card-gates.

Group sorting

Figure 7:
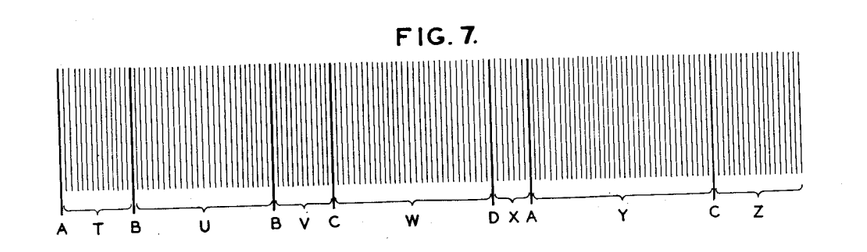
Fig. 7 is a schematic showing of master and detail cards as they are arranged before being "group sorted"

One of the uses of group sorting lies in large factories wherein a great many workmen are employed at varied hourly rates of pay, and wherein a large variety of jobs is done. Here, a time slip is made out for each workman on each job he does. Thus, a certain workman, who has worked on three different jobs within a certain pay period, will have three time slips. Each time slip will show the workman's name or number, his hourly rate of pay, the job number, and the time consumed by him on that particular job, the hourly rate of pay, of course, for any one workman, being the same on all jobs. At the end of a pay period, these time slips are turned in to the bookkeeping department. A card is then punched for each time slip, according to the data thereon and the cards are sorted according to workmen's numbers in the regular fashion. A master card is then inserted in front of each group of workmen's cards. These master-cards indicate an hourly rate of pay and may be of varied colors for convenience. Fig. 7 shows, schematically, the cards and master-cards for seven workmen, T, U, V, W, X, Y, and Z, ready to be inserted in the group sorter. Here, it is seen that workman T has an A hourly rate; workman U has a B hourly rate; workman V has the same rate as workman U; etc. The group sorter will now deposit all the cards of workmen T and Y in one pocket; the cards of workmen U and V in another pocket; the cards of workmen W and Z in a third pocket; and the cards of workman X in a fourth pocket, thus bringing the cards of all workmen having the same hourly pay into one particular sorter pocket. In order to do this, it is necessary to sense only master-cards, and it is further necessary to hold open each particular pocket until all the detail cards, associated with a sensed master-card, have been deposited in the pocket to which the sensed master-card is sent. For this purpose the following mechanism is employed.

Card-gate locking mechanism

Figure 3:
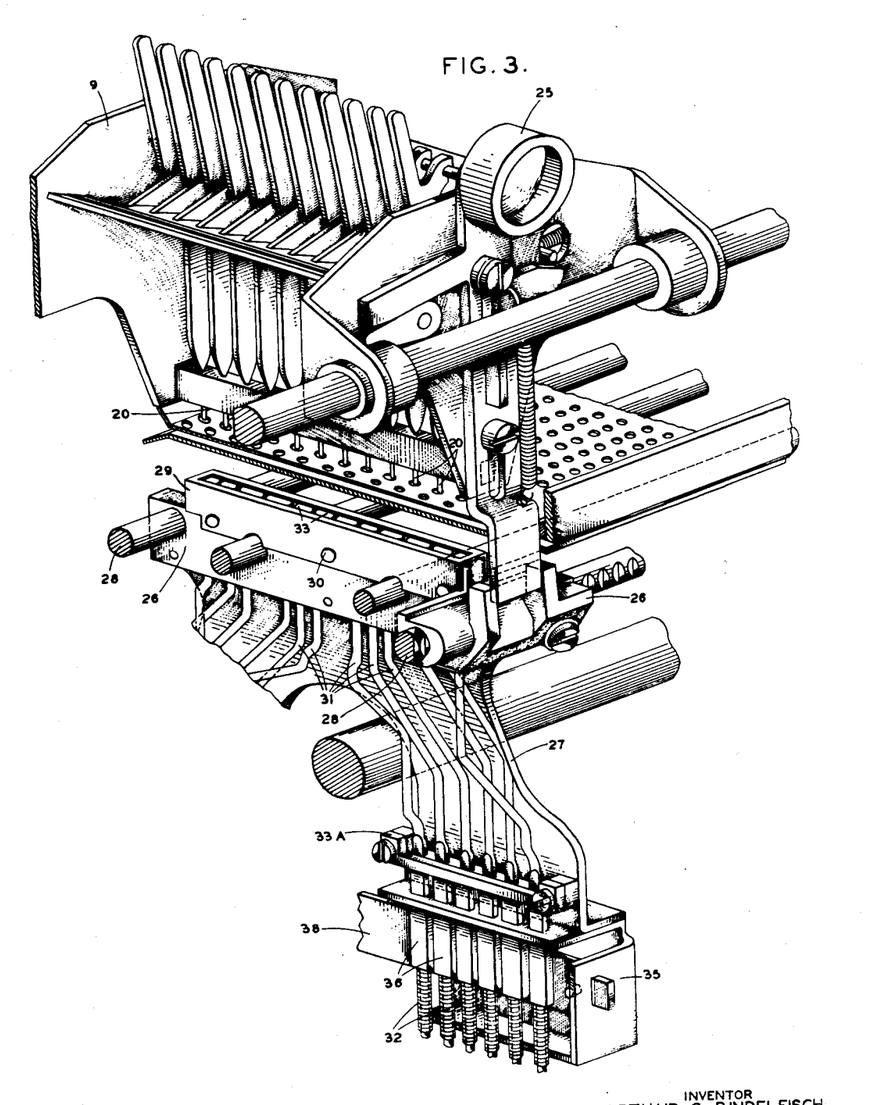
Fig. 3 is a fragmentary isometric showing the sensing pins, part of the card-gate locking mechanism, and the wires for operating the card-gate locking mechanism.

Referring particularly to Fig. 3, it is seen that the regular pin box 9 carries a manually operable release lever 25 which engages a block 26 which block is carried by a main frame piece 27 of a card-gate locking device. In order to move the sensing pin-box 9 from one columnar position to another, it is necessary to first depress the release lever 25 and hold it depressed. When the lever 25 is depressed, it engages the block 26, as is shown in Fig. 3, and, consequently, whenever the pin box 9 is moved, the card-gate locking device is moved with it. The locking device, therefore, is always in exact vertical alignment with the pin box upon a pair of rails 28 and this device, in the present machine, takes the place of the usual Bowden wire terminal strip X, shown in Fig. 1.

As is best seen in Figs. 2, 4, 5, and 6, block 26 has, fastened to its top, a bracket 29 which has an inverted U-shape and which is secured to the block 26 by screws 30. The purpose of the bracket 29 is to limit the upward movement of a set of twelve translator wires 31 which wires pass through suitable holes in the block 26 and are pressed upward by a set of springs 32. The translator wires 31 have broadened tops 33 which are limited by the bracket 29. At their bottoms, the wires 31 are supported and guided in a pair of split retaining pieces 33A and these retaining pieces are fastened, by any suitable means, to the frame 27.

Figure 2:
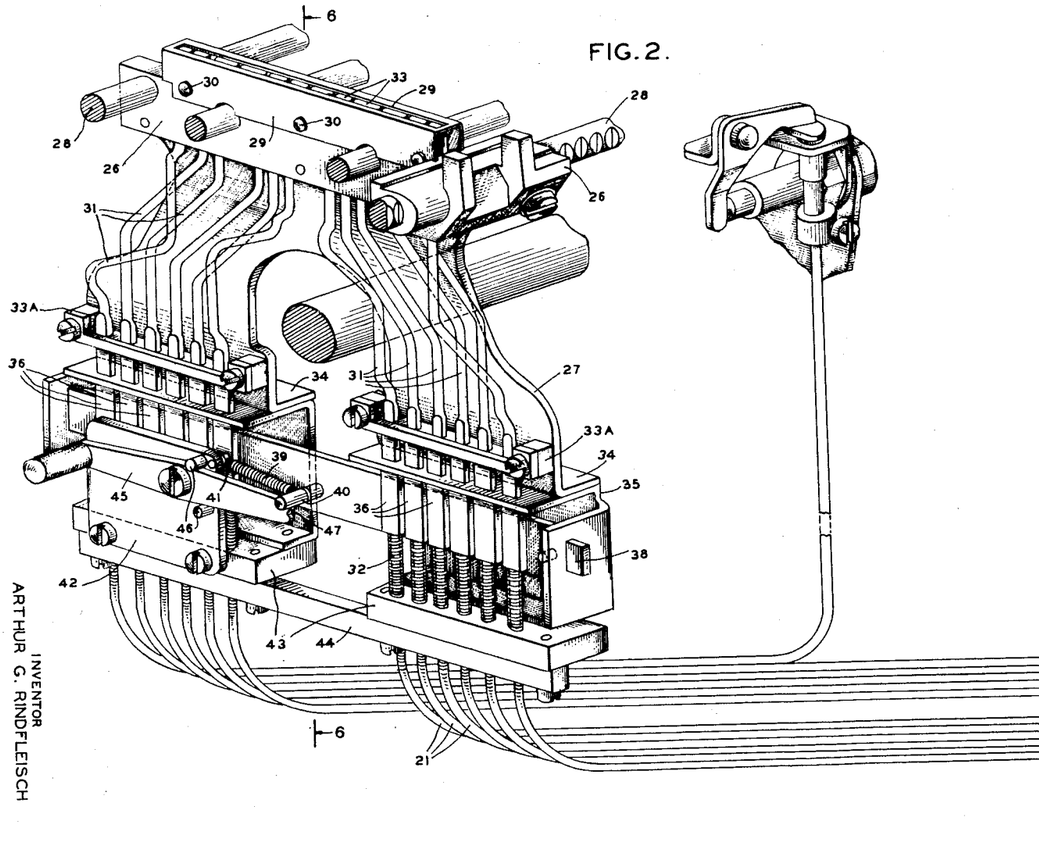
Fig. 2 is a fragmentary isometric showing the card-gate locking mechanism and part of the card-gate opening mechanism.
Figures 4, 5, 6:
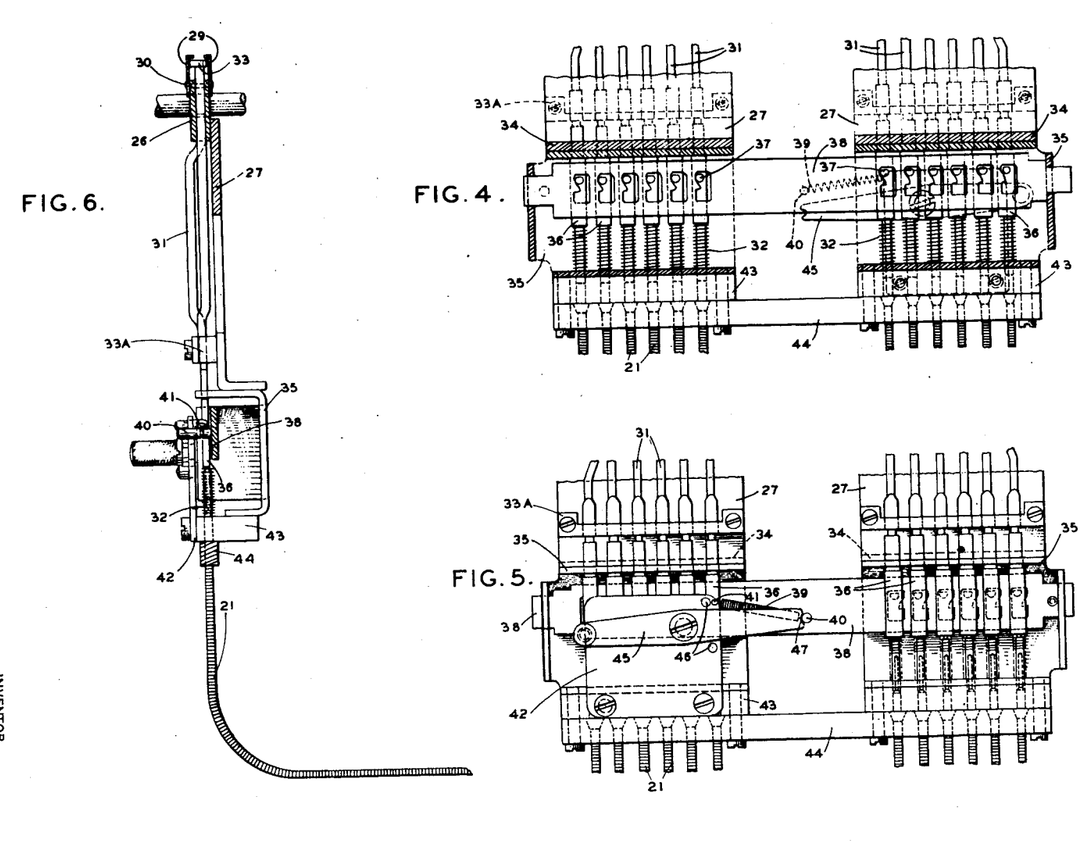
Fig. 4 is a sectional fragmentary elevational detail view of the card-gate locking mechanism showing the locking slide in full.
Fig. 5 is a fragmentary elevational view of the card-gate locking mechanism showing the locking slide disabling lever.
Fig. 6 is a left-hand sectional side elevation of the card-gate locking mechanism taken along the line 6—6 of Fig. 2.

At its bottom, the frame 27 is divided and bent off into a pair of steps 34 and to each step is fastened a translator-pin support bracket 35. The brackets 35 are generally U-shaped and each has one closed end, the open ends facing each other toward the center of the frame 27. Each bracket 35 supports and guides six latching pins 36 which pins, as is best shown in Fig. 4, have extrusions 37, thereon, for cooperation with a locking slide 38. The slide 38 is slidably mounted, at each end, in turned-over ends of the brackets 35 and is tensioned toward the right in Fig. 4 by a spring 39. The spring 39 is anchored, at one end, to a stud 40 which is held by the locking slide 38 and is anchored at its other end to a small pin or stud 41, which stud, as is best seen in Fig. 2, is fast in a square plate 42. The plate 42 is fastened to one of a pair of pin-guide blocks 43 which blocks are secured to the lower faces of the brackets 35. The blocks 43 guide and support the lower ends of the pins 36 and also act as retainers for the springs 32. Suitably fastened to the lower faces of the blocks 43, is a Bowden wire terminal strip 44 which strip aligns and maintains the Bowden wires 21 directly under the pins 36.

To the rearward face of the plate 42 is pivoted a locking-slide disabling lever 45 which is limited in movement by a pair of studs 46 which studs are secured in the plate 42. The lever 45 carries, upon its left-hand end (right-hand in Fig. 2), a notch 47 which is adapted to act upon the pin 40 and move the slide 38 to its inactive position against the tension of the spring 39. The inactive position of the slide 38 is shown in Fig. 5 and the active position is shown in Figs. 2 and 4.

Returning to Fig. 3, it is seen that if, in sensing a card, a pin 20 enters a hole, it will depress a translator wire 31. If the disabling lever 45 (Fig. 2) is in its inactive position, then the depressed wire 31 will depress a corresponding pin 36 and the extrusion 37 (Fig. 4), thereon, will cam the slide 38 to the left (Fig. 4) and will pass downward to a position where it is below the cam points on the slide. The spring 39 will then snap the slide 38 back to the right and thus lock the pin 36 depressed until another translator wire is depressed on a subsequent sensing. The pin 36, in its depressed position, depresses the core of a respective Bowden wire and thus opens a card-gate on the sorter.

From the foregoing, it is evident that, as long as the disabling lever 45 remains in its inactive position and allows the slide 38 to remain active, the depression of any translator wire 31 will release all previously locked pins 36 and will allow the slide to lock depressed the particular pin 36 which the wire 31 is, at the moment, depressing. It is further evident that, if the disabling lever 45 is manually moved to its Fig. 5 position wherein it holds the slide 38 inactive, the machine will function as a standard sorter and the pins 36 will never be locked in their depressed positions.

Auxiliary sensing device

Figure 11:
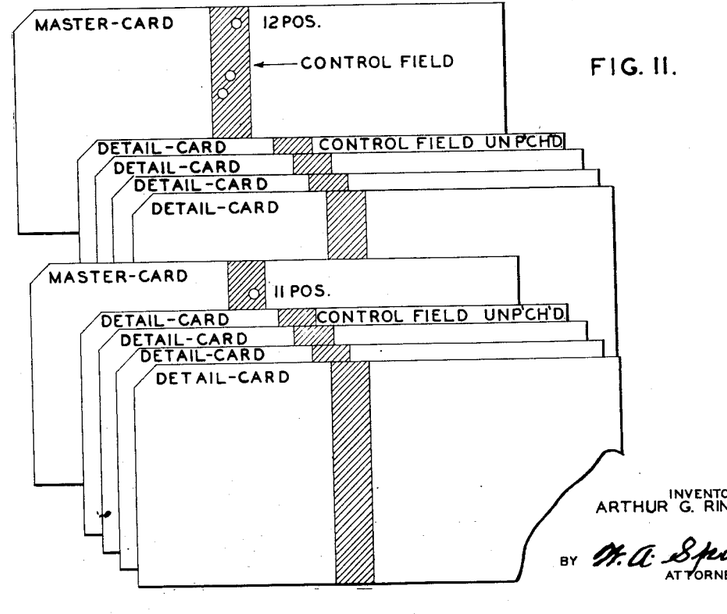

Fig. 11 shows two groups of detail cards with their associated master cards and it will be noted that a field of only three columns width is shown as a control field. In actual usage, it was found that these three particular columns were the only available control columns as, in most installations, it was necessary to punch all the other fields with data punchings. It is evident that with the machine, as thus far described, it would be possible to "group sort" groups of cards, whose master-cards were punched in the above three columns, by sensing only master-cards. However, it will be observed that, to do this, none of the detail cards can be punched in the control columns. With the above arrangement, the sensing of a master-card would open and lock open a certain card-gate and, since the detail cards would all be unpunched in the control columns, the card-gate would remain open until another master-card was sensed.

Figure 10:
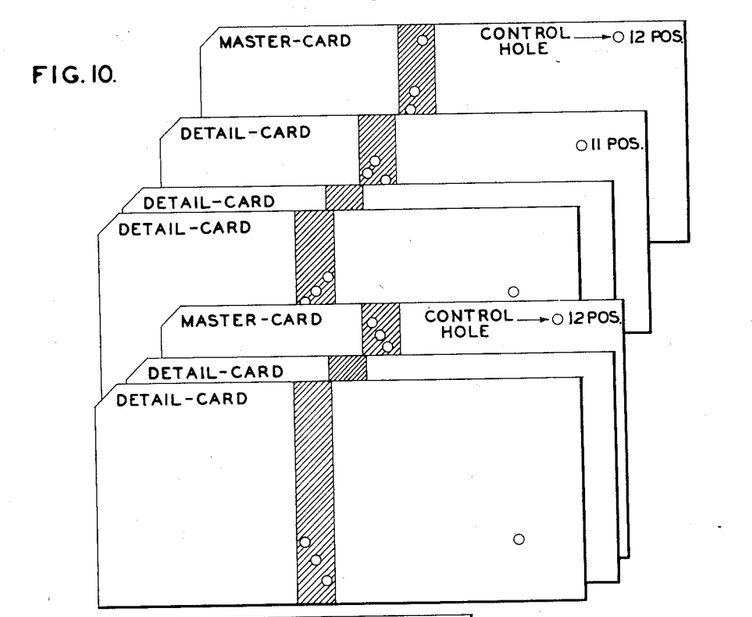
Figs. 10 and 11 show groups of cards for the purpose of comparison.

In certain uses of the group sorter, it was found that it was necessary to punch data on the detail cards in the control columns as well as the others and, in these instances, group sorting could not be accomplished with the machine as thus far described. To remedy this, an auxiliary sensing device was added. This device has only one sensing pin and this pin overlies the XII position in a card being sensed. Hence, as is seen in Fig. 10, the master-cards have a control hole in the XII position and the columnar position of the control hole is other than the columnar position of the regular sensing device. As the detail cards are never punched with data punchings in the XII position, the auxiliary sensing device will find holes in the master cards only, thus allowing both master-cards and detail cards to be punched with data punchings in every field of the cards.

In Figs. 12, 13, 14, and 16, the auxiliary device is shown in top plan, rear elevation, left-hand elevation, and top plan respectively. As is seen particularly in Fig. 12 the reciprocating sensing head is almost identical to the standard head shown in Fig. 1 of the Patent No. 1,476,161 to Lasker, but in the present machine a new end bracket 50 takes the place of the bar 73 in the above patent. The side rails 51 and 52 have been lengthened and a new pin 53 has been added to the regular pin-locking bail 54.

Figure 12:
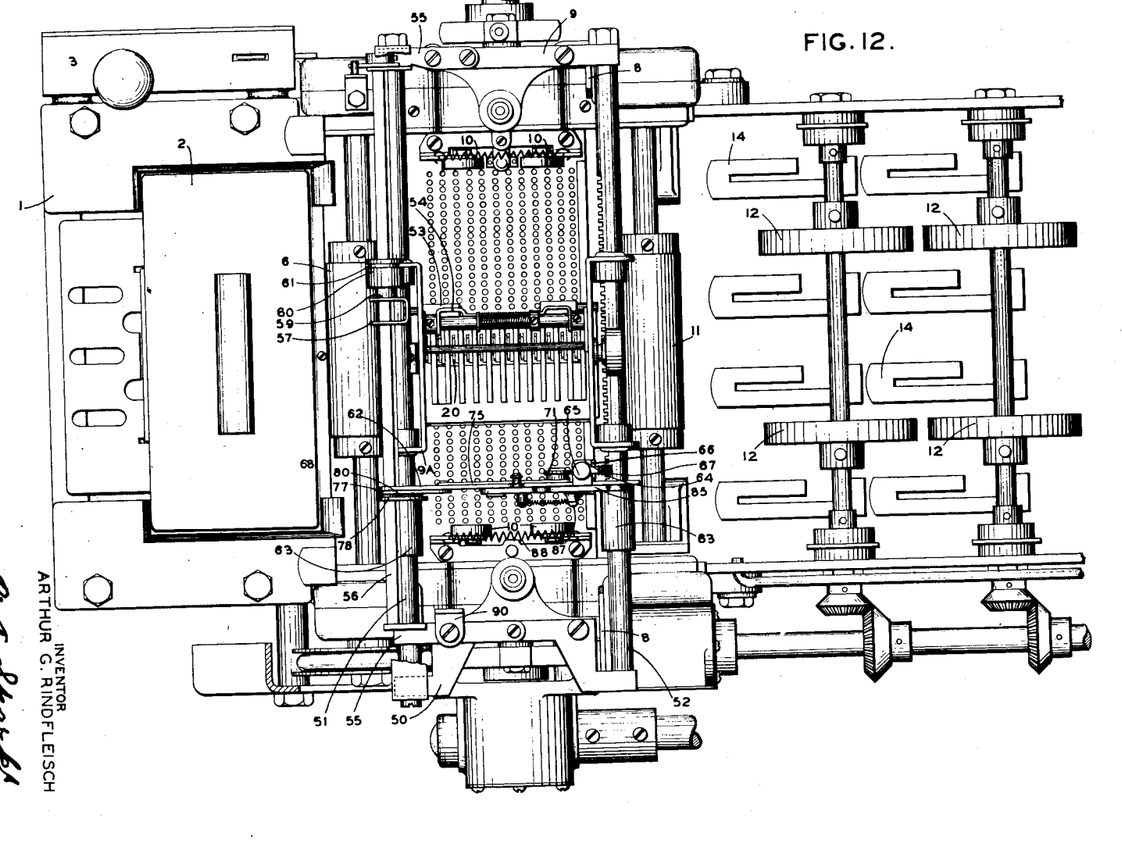
Fig. 12 is a top plan view of the sensing mechanism and of the card-feeding mechanism showing the first two card-gates and the first two conveyor rolls.
Figures 13, 14, 15, 16:
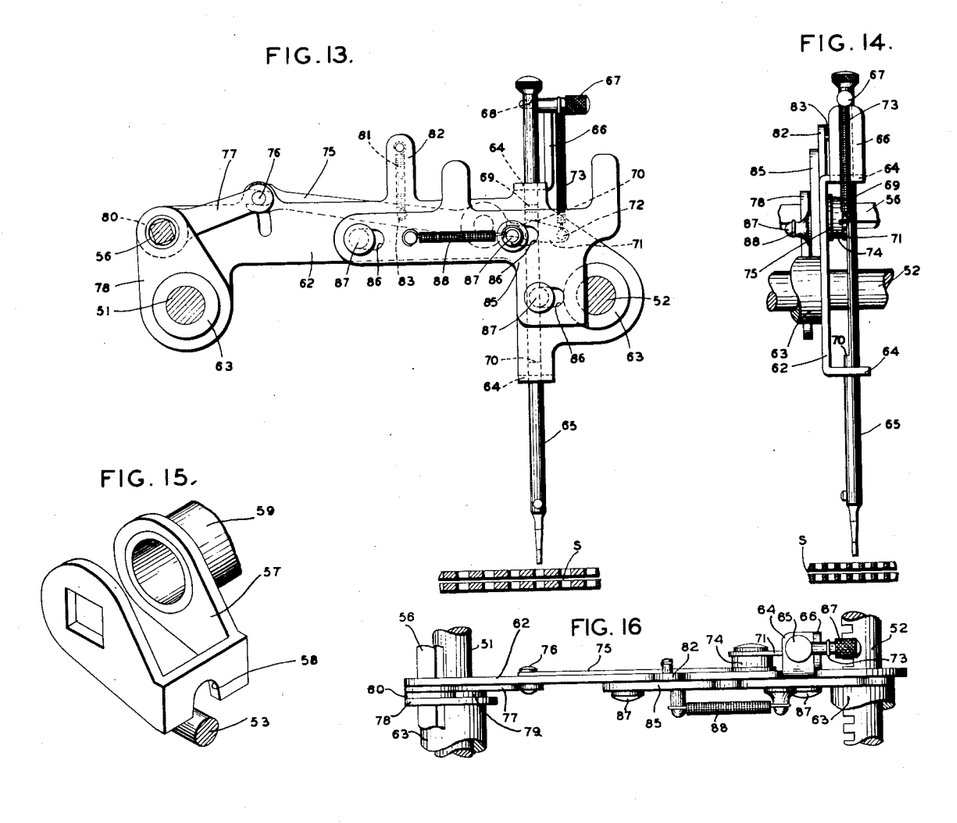
Fig. 13 is a rear elevation of the auxiliary sensing mechanism for sensing master-cards.
Fig. 14 is a left-hand side elevation of the auxiliary sensing mechanism.
Fig. 15 is an isometric detail of the sensing-pin baffle piece.
Fig. 16 is a top plan view of the auxiliary sensing device.

Referring to Figs. 12, 13, and 14 together, it will be seen that mounted for rotation in a pair of end brackets 55, (shown only in Fig. 12) is a square shaft 56. The end brackets 55 are screwed to the end castings of the reciprocating sensing head so that the shaft 56 moves with the head at all times. The shaft 56 is rounded at each end where it engages the brackets 55. Loosely mounted upon the square shaft 56 is a ball-shaped baffle piece or locking ball 57 (Figs. 12 and 15) of substantial depth. As is particularly shown in Fig. 15, this baffle piece 57 is made with a slot 58 in its lower edge. Normally, the baffle-piece 57 lies in such a position that the slot 58 lies directly above the pin 53 (Figs. 12 and 15) and does not engage it. At certain times, to be hereinafter set forth, the shaft 56 will be rocked to pull the slot 58 into locking engagement with the pin 53.

As is seen in Figs. 12 and 15, the baffle-piece 57 has fastened to its front side, a small hub 59 which hub is mounted for sliding movement upon the shaft 56 and which is rotatable therewith. Fastened to the front face of the hub 59 is a larger hub 60. The hub 60 has an annular groove 61 in its periphery and this groove constantly engages the right-hand frame plate 9A (Fig. 12) of the regular pin box 9. It is, thus, evident that, when the pin box 9 is slid along its rails 51 and 52, the hub 60 and the baffle-piece 57 are carried with it. Thus, the slot 58 in the baffle-piece 57 is constantly aligned with the pin 53 on the sensing-pin locking ball 54.

As is seen from Figs. 12, 13, 14, and 16, the auxiliary sensing mechanism is mounted upon a frame plate 62. Fast upon each end of the frame plate 62, is an elongated hub 63 and it is because of these hubs, which are slidably mounted upon the rails 51 and 52, that the rails were lengthened in the present machine. At one end, the frame plate 62 is bent over into a pair of ears 64 which are drilled to receive a special sensing pin 65. The upper ear 64 is further bent upward into a stop finger 66 and this stop finger 66 limits the downward movement of the sensing pin 65 in relation to the frame plate 62. The sensing pin 65 is drilled in two places, 68 and 69, to receive a shouldered pin 67. These two drilled places or holes 68 and 69 are shown only in Figs. 13 and 14 and their uses will be described later. The sensing pin 65 is cut out along its middle portion so as to form shoulders 70 thereon. Lying in the cut-out portion between shoulders 70, is a short arm 71 in which is drilled a hole 72. This hole receives the lower end of a spring 73, the upper end being anchored to the pin 67. The short arm 71 is fastened to one side of a hub 74 (Figs. 14 and 15) which hub is riveted to or otherwise secured for rotation upon the frame plate 62. Fast to the other side of the hub 74 is a long arm 75. This arm or lever 75 has a forked end which engages a stud 76 which stud is fast in the free end of a rock-lever 77 (Figs. 12 and 13). The rock lever 77 is slidably mounted upon the square shaft 56, but is of such construction that, whenever the lever 77 is rocked, the shaft 56 must rotate with it. As is seen in Figs. 12, 13, and 16, an upwardly extending arm 78 is rigidly secured to the frame plate 62 by a hub 79 so that the arm 78 slides with the frame plate 62, upon the rails 51 and 52 of the sensing head, but does not rotate, in either direction, about its associated rail 51. The arm 78 serves to support the rock-arm 77 by reason of the fact that a hub 80, on the arm 77, is shouldered and journaled, at one end, in the support-arm 78.

The rock-arm 77 is constantly urged counterclockwise, as seen in Fig. 13, by the arm 75 through a spring 81, which is anchored, at its top, to stud in an upright finger 82 of the frame-plate 62, and which spring is anchored, at its lower end, to a pin 83 held in the lever 75.

Figs. 12, 13, 14, and 16, show a locking plate 85 slidably mounted upon the rear face of the frame plate 62. The locking plate 85 is provided with three slots 86 (Fig. 13) which slots ride three shouldered studs 87, the studs being fast in the frame plate 62. A spring 88 is anchored, at one end to a stud in the locking plate 85 and is anchored, at its other end, to a stud 87 and the spring 88 tends, constantly to draw the locking plate 85 into the teeth of the rail 52. When it is desired to move the auxiliary sensing unit along the rails 51 and 52, the locking plate is manually held out of engagement with the teeth on rail 52, thus leaving the auxiliary sensing device free to be manually slid along the rails to any desired columnar position.

The main function of the auxiliary sensing device is to enable and disable the regular sensing device through the square shaft 56 (see particularly Fig. 12), the locking ball 57, and the pin 53, which control the locking ball 54.

The functioning of the regular sensing device is thoroughly described beginning on page 3, line 21, and ending on page 4, line 7, in Patent No. 1,476,161 to W. W. Lasker. It is sufficient here to say that if the bail 54 on the regular sensing device, which bail is shown in its normal position in Fig. 12, is locked in that position, then all the regular sensing pins 20 will be disabled. If, however, the bail 54 is allowed freedom, then the sensing pins 20 will be allowed to function normally.

*Machine operation*

In the normal position of the machine, the various parts of the auxiliary sensing device lie as is shown in Fig. 13. The square shaft 56 lies in such a position that the locking ball 57 (Figs. 12 and 15) is out of engagement with the pin 53. If, now, a master-card is sensed, the special sensing pin 65 (Fig. 13) will descend with the sensing head and enter a special (XII position) control hole in the card. This will leave all the parts of the auxiliary sensing device unmoved and, therefore, the locking ball 57 will remain inactive. Thus, the regular sensing device will sense the designation number punched in the data rows of the master-card and the master-card will be sent to its proper pocket. Also, the card-gate on this pocket will be locked open to receive subsequent detail-cards.

Assume that the master-card, just mentioned, is followed by five detail-cards and then another master-card. It is, then, necessary to disable the regular sensing device for five machine cycles or until the second master-card enters the sensing chamber. After the first detail-card enters the sensing chamber S (Fig. 13), the sensing head moves down carrying the two sensing devices with it. The special pin 65, finding no hole in the detail-card, is moved upward in relation to the frame plate 62. The spring 73 is, thus, heavily tensioned and it swings the arms 71 and 75 counterclockwise as a unit, as seen in Fig. 13. This moves the rock-lever 77 clockwise, thus rocking the square shaft 56 clockwise. The clockwise movement of the shaft 56 causes the locking ball 57 (see Fig. 12) to engage and lock the pin 53 on the bail 54 of the regular sensing device, thus, disabling the regular sensing device. The detail-card will, therefore, enter the same pocket as its master-card. The following four detail-cards will also be sent to the same pocket. On the seventh sensing cycle, the second master-card will be sensed, as above, and, if its designation number (found in the data rows only) is the same as that of the preceding master-card, the second master-card and its associated detail-cards will be sent to the same pocket as the preceding master-card. If, however, the designation number on the second master-card is different than that of the first master-card, then the slide 38 (see Fig. 4) will be cammed to the left by the depression of a new sensing-pin or pins and the previously locked wires 31 will be released. This will lock open a new card-gate as has previously been explained.

If it is desired to use the present machine as a straight sorter, the lever 45 is moved from its Fig. 4 position to its Fig. 5 position, thereby disabling the locking slide 38. Also, the auxiliary sensing device is moved to its rearmost position on the rails 51 and 52 (Fig. 12). This brings the upright arm of an angle bracket 90 directly under the rock-arm 77 and locks the square shaft 56 in its normal position. The special sensing pin 65 (see particularly Figs. 13 and 14) is manually raised and the small pin 67 is removed from the hole 68 and inserted in the hole 69. Thus, the special pin 65 is locked in an inactive position and the machine will function as a straight sorter.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, the combination with main operating mechanism for said machine, of a reciprocable frame, a main sensing device slidably mounted upon said frame, a rock shaft mounted upon said frame, a bail slidably mounted upon said shaft, and operable to enable and disable said main sensing device, said bail being movable along said shaft by said main sensing device, a pair of levers operable to rock said shaft, and a special card-sensing pin mounted upon said reciprocable frame and operable thereby to effect movement of said levers according to its findings.

2. In a machine of the class described, the combination with main operating mechanism for said machine, of a plurality of card receptacles; a plurality of card-gates, one for each receptacle; means for conveying cards to said receptacles, a main sensing device, an auxiliary sensing device for controlling the operation of said main sensing device, a plurality of removable translator wires operable by said main sensing device, a plurality of locking pins depressible by said translator wires, a locking member for locking one or another of said pins depressed and for simultaneously releasing any previously depressed pins, means for manually disabling said locking member, and means operable by said pins for opening and locking said card-gates.

ARTHUR G. RINDFLEISCH.